H. KLECKLER.
LANDING GEAR FOR AIRCRAFT.
APPLICATION FILED JAN. 30, 1918.
1,336,633. Patented Apr. 13, 1920.
2 SHEETS—SHEET 1.
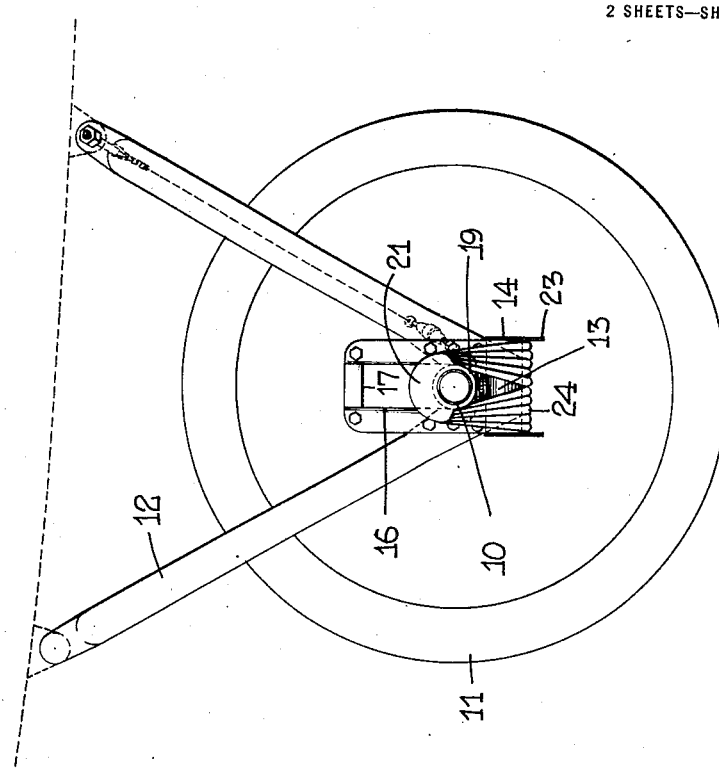
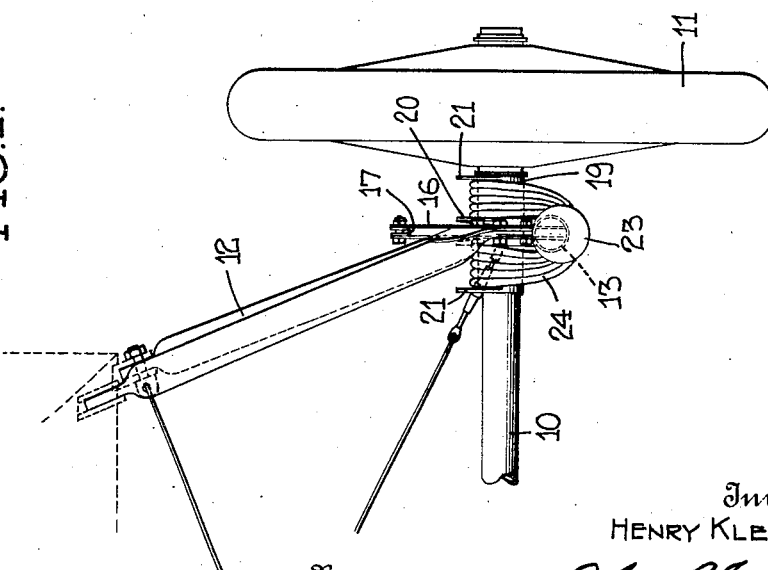
Inventor
HENRY KLECKLER
By
*John P. Tarbox*
Attorney

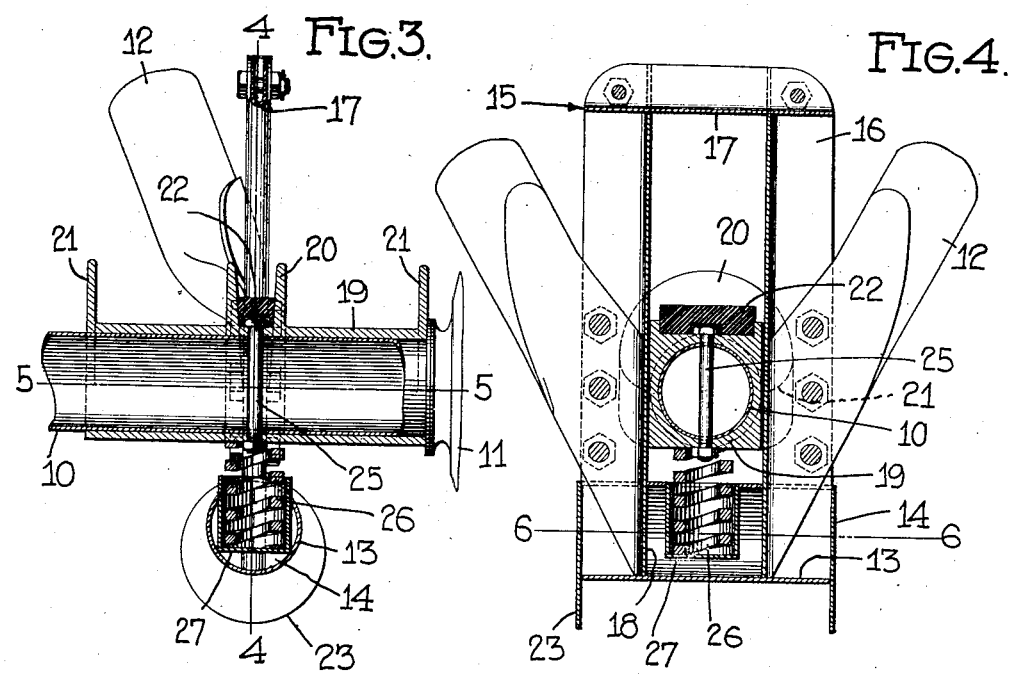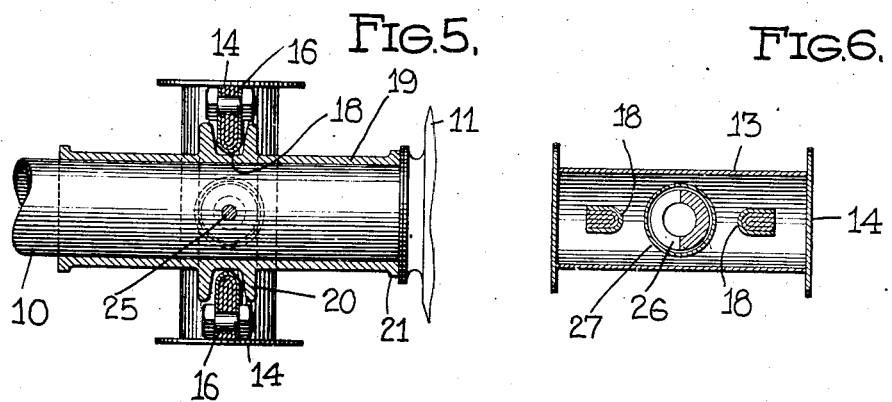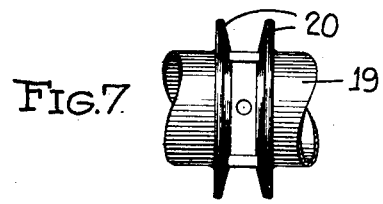

UNITED STATES PATENT OFFICE.

HENRY KLECKLER, OF BUFFALO, NEW YORK, ASSIGNOR TO CURTISS AEROPLANE AND MOTOR CORPORATION, A CORPORATION OF NEW YORK.

LANDING-GEAR FOR AIRCRAFT.

1,336,633. Specification of Letters Patent. Patented Apr. 13, 1920.

Application filed January 30, 1918. Serial No. 214,540.

*To all whom it may concern:*

Be it known that I, HENRY KLECKLER, a citizen of the United States, residing at Buffalo, in the county of Erie and State of New York, have invented certain new and useful Improvements in Landing-Gears for Aircraft, of which the following is a specification.

My invention relates to landing gear for aircraft.

A characteristic of the invention is the complete elimination of the conventional cross brace of the landing gear without impairing its capabilities or strength. In lieu of the cross brace flanges and rigid axle guides are provided. The flanges are formed either upon saddles carried by the axle or upon the axle itself and engage with opposite faces of the guides. The guides in turn are made stronger than is now the practice and are carried at the foot of the struts. In this way the axle is held against axial displacement and made to combinedly serve as a support for the landing gear wheels or runners and as a compression member or brace between the opposed guides or struts. Moreover, fairing of true streamline form is used on the axle with a resulting decrease in head resistance or drag. The remaining constructional features of the invention such as the guide formation and strut end connection will be hereinafter more particularly pointed out.

Of the drawings:—

Figure 1 is a front end elevation of the landing gear, partly broken away.

Fig. 2 is a longitudinal vertical sectional view.

Fig. 3 is an enlarged transverse sectional view detailing the axle mounting.

Fig. 4 is a longitudinal vertical sectional view on the line 4—4 of Fig. 3.

Fig. 5 is a longitudinal horizontal sectional view on the line 5—5 of Fig. 3.

Fig. 6 is a fragmentary sectional view (similar to Fig. 5) on the line 6—6 of Fig. 4, and Fig. 7 is a fragmentary plan view showing the center flange formation.

The invention, as above pointed out, is characterized by an improved arrangement and construction of landing gear parts. In consequence of this improvement the landing gear is lightened and manufacturing cost reduced. Instead of the usual cross brace between the opposed struts of the landing gear, flanges are provided upon the axle ends which hold it against axial movement. The axle thus serves not only as a support for the landing gear runner but combinedly as a brace between struts—a purpose new in the art. In the embodiment of the invention illustrated the axle is designated as 10. It is constructed preferably of metal tubing. The ends of the axle extend beyond the landing gear struts and support upon their extremities landing gear wheels 11, or their equivalent, *i. e.*, runners, or if a hydro machine, pontoons. The struts, designated as 12 converge downwardly from the fuselage or body so as to constitute substantially V-struts (see Fig. 2). The struts in each instance are separately formed and united beneath the axle by fittings 13 of a special form. These fittings (see Figs. 4 and 6) are constructed of metal tubing having closed ends 14.

The struts 12 are further united by vertical guides 15 of great strength and rigidity. At one end the guides are extended into the fittings 13 as are also the struts 12 (see Fig. 4). This is to strengthen both the guides and fittings at their points of attachment with the struts 12, and to rigidly unite these parts; the guides and fittings combinedly serving as connections between adjacent struts. For increased strength at this point the guides 15 are longitudinally grooved as at 16 and the strut ends seated in them.

Vertical slots 17 are formed in the guides 15 through which the axle 10 extends and within which it works when vertically displaced. The margins of the slots 17 or rather the inside edges of the guide 15 are rounded as at 18 to prevent binding of the axle incident to laterally directed shocks in landing. These rounded surfaces follow naturally in view of the material used and construction of the guides themselves. The guides it will be noted are constructed of metal strips bent longitudinally throughout their full length. Moreover the grooves 16 are formed by this bending of the metal strips.

Saddles 19 are provided at the points of intersection of the axle 10 with the guides 15. These saddles are preferably constructed in the form of sleeves which embrace the axle. They are welded in place and provided with center flanges 20 and terminal flanges 21. The former, flanges 20, engage with opposite faces of the guides 15 to rigidly hold the axle in place. The placement of these flanges is such that they together form a peripheral groove within which the rounded edges of guides 15 are seated.

Although of sleeve-like form the saddle 19 throughout that portion of its length intermediate the flanges 20, is of angular cross section (see Fig. 4). This angular cross section prevents rotation of the axle. In addition, the flanges 20 provide a retaining means for a rubber strip 22 so placed that it engages the guide 15 in the event of maximum vertical displacement of the axle.

The flanges 21 together with flanges 23 formed upon the ends of the fitting 13 serve as abutments for shock absorber elastics 24. The flanges 20, to a certain extent, likewise act as abutments. The elastics 24 are laced over the axle at opposite sides of the guides and beneath the fittings 23. Each saddle and each fitting is twice intersected. This tends to equalize the tension upon the elastics and to more properly distribute the resulting strains upon them. As a further means for preventing rotation of the saddle 19 upon the axle a bolt 25 is provided.

To take up re-bound shocks springs 26 are interposed between the fittings 13 and the axle. These springs are seated in pockets 27 extended into the fittings 13 so as to be inclosed or rather partly inclosed and accordingly removed from view.

The disposition of the flanges 20 at opposite sides of the respective guides 15 is such that axial displacement of the axle is prevented. The axle, in consequence, under certain conditions, is subject to compression strains. If a cross brace were used the vertical displacement of the axle would be relative to it and if the cross brace and axle were streamlined as a unit, obviously the streamline would be broken. By this construction a perfect streamline may be given the axle as such relative movement of the parts mentioned is avoided. In addition, the factor of safety is in no wise lessened as the strains imposed upon the cross brace are not severe and may be adequately taken care of by placing the axle under compression. Furthermore, the rigid construction of the vertical guides strengthens the struts at the point most needed. The decrease in head resistance is occasioned by the elimination of the cross brace and the better streamline form given the axle regardless of its position.

Although I have described more or less precise forms and details of construction, I do not intend to be understood as limiting myself thereto as I contemplate changes in form, the proportion of parts and the substitution of equivalents as circumstances may suggest or render expedient and without departing from the spirit of the invention as claimed.

I claim—

1. In a landing gear for aircraft, spaced landing gear struts, a cross connection between the struts, shock absorber elastics laced transversely beneath the struts and over the cross connection, guides for the cross connection rigidly supported at the foot of the struts, and means on the cross connection and engaging the guides to prevent axial displacement of the cross connection.

2. In a landing gear for aircraft, spaced landing gear struts, an axle, yielding connections respectively between the struts and axle, the connections in each instance engaging the axle at points laterally removed from the struts, and means on the axle between the connections and struts and engaging the latter to prevent axial displacement of the axle.

3. In a landing gear for aircraft, spaced landing gear struts, an axle, yielding connections respectively between the axle and struts, the connections in each instance engaging the axle at opposite sides of the struts, and means on the axle between the connections and struts and engaging the latter to prevent axial displacement of the axle.

4. In a landing gear for aircraft, spaced landing gear struts, an axle, shock absorber elastics laced transversely beneath the strut and across the axle at opposite sides of the strut, and means on the axle between the elastics and struts and engaging the latter to prevent axial displacement of the axle.

5. In a landing gear for aircraft, a pair of downwardly converging struts constituting collectively a substantially V-strut, a tubular fitting mounted at the foot of the V-strut, the arrangement of the fitting being such that a rigid connection between the converging struts is provided, an axle, and shock absorber elastics laced above the axle and beneath the fitting to engage in each instance the rounded exterior surfaces thereof.

6. In a landing gear for aircraft, a pair of downwardly converging struts constituting collectively a substantially V-strut, a tubular fitting into which the adjacent ends of the struts are extended, an axle, and shock absorber elastics laced above the axle and beneath the fitting to engage in each instance the rounded exterior surface thereof.

7. In a landing gear for aircraft, a pair of downwardly converging struts constituting collectively a substantially V-strut, an axle guide having opposed grooves into which the adjacent ends of the struts are fitted, a tubular fitting mounted beneath the struts and into which the guide extends, an axle, and shock absorber elastics laced above the axle and beneath the fitting.

8. In a landing gear for aircraft, a pair of downwardly converging struts constituting collectively a substantially V-strut, a tubular fitting into which the adjacent ends of the struts are fitted, an axle, shock absorber elastics laced for contact with both the axle and the fitting, and a rebound elastic inclosed, partly at least, within the fitting.

9. In a landing gear for aircraft, a pair of downwardly converging struts constituting collectively a substantially V-strut, a rigid vertical guide mounted at the foot of the V-strut, an axle, a saddle rigidly fastened to the axle at its point of intersection with the guide, shock absorber elastics for limiting the vertical displacement of the axle, and flanges formed upon the saddle on opposite sides of the vertical guide, the arrangement of the flanges being such that axial displacement of the axle is prevented.

10. In a landing gear for aircraft, spaced landing gear struts, an axle, yielding connections respectively between the axle and struts, and means on the axle between and in engagement with both the connections and struts to jointly prevent axial displacement of the axle relatively to the struts and lateral displacement of the connections relatively to the axle.

11. In a landing gear for aircraft, downwardly converging struts, a tubular fitting mounted at the foot of the struts, a vertical axle guide carried by the struts and extended into the fitting, an axle, and shock absorber elastics laced for contact with the rounded surfaces of both the axle and fitting.

12. In a landing gear for aircraft, spaced landing gear struts, an axle, shock absorber elastics laced transversely beneath the struts and across the axle at opposite sides of the struts, and means on the axle between and in engagement with both the elastics and struts to jointly prevent axial displacement of the axle relatively to the struts and lateral displacement of the elastics relatively to the axle.

13. In a landing gear for aircraft, spaced landing gear struts, an axle, guides mounted at the foot of the struts, yielding connections respectively between the struts and axle, the connections in each instance engaging the axle at points laterally removed from the guides and means on the axle between the connections and guides and engaging the latter to prevent axial displacement of the axle relatively to the struts.

14. In a landing gear for aircraft, spaced landing gear struts, an axle, rigid axle guides mounted at the foot of the struts, shock absorber elastics laced transversely beneath the struts and across the axle at opposite sides of the struts, and means on the axle between the elastics and guides and engaging the latter to prevent axial displacement of the axle relatively to the struts.

15. In a landing gear for aircraft, spaced landing gear struts, an axle, rigid axle guides mounted at the foot of the struts, shock absorber elastics laced transversely beneath the struts and across the axle at opposite sides of the guides, and means on the axle between and in engagement with both the elastics and guides to jointly prevent axial displacement of the axle relatively to the strut and lateral displacement of the elastics relatively to the axle.

In testimony whereof I hereunto affix my signature.

HENRY KLECKLER.